United States Patent
Merritt

(10) Patent No.: US 6,730,158 B1
(45) Date of Patent: May 4, 2004

(54) ASPHALTIC CONCRETE AND METHOD OF MAKING SAME

(76) Inventor: Ervin Merritt, P.O. Box 1618, Granbury, TX (US) 76048

( * ) Notice: Subject to any disclaimer, the term of this patent is extended or adjusted under 35 U.S.C. 154(b) by 0 days.

(21) Appl. No.: 10/278,638

(22) Filed: Oct. 23, 2002

(51) Int. Cl.[7] .................. C08L 95/00; C09D 195/00
(52) U.S. Cl. ........................... 106/274; 106/275
(58) Field of Search ................... 106/274, 275

(56) References Cited

U.S. PATENT DOCUMENTS

| | | |
|---|---|---|
| 2,003,861 A | 6/1935 | McConnaughay |
| 2,212,574 A | 8/1940 | Roth |
| 2,899,329 A | 8/1959 | Lyons |
| 2,899,330 A | 8/1959 | Lyons |
| 3,075,851 A | 1/1963 | Hemwall |
| 3,077,740 A | 2/1963 | Hemwall |
| 3,738,425 A | 6/1973 | Thompson |
| 3,876,439 A | 4/1975 | Schneider |
| 3,980,489 A | 9/1976 | Schneider |
| 4,941,924 A | 7/1990 | Merritt |
| 5,000,789 A | 3/1991 | Merritt |

OTHER PUBLICATIONS

Florida Citrus Oils, Bulletin 749 (technical), Agricultural Experiment Stations, Institute of Food and Agricultural Sciences, University of Florida Gainsville, J.W. Kesterson, R. Hendrickson and R.J. Braddock, (Dec. 1971,) pp. 154–157.

*Primary Examiner*—David Brunsman
(74) *Attorney, Agent, or Firm*—Geoffrey A. Mantooth

(57) ABSTRACT

A composition of asphaltic concrete and the method of making the same are disclosed. The asphaltic concrete has asphalt cement, sulfuric acid and citrus stripper oil admixed together. This admixture is mixed with some aggregate and then packed and consolidated. The resulting paved surface resists rutting and requires less maintenance.

6 Claims, No Drawings

ASPHALTIC CONCRETE AND METHOD OF MAKING SAME

FIELD OF THE INVENTION

The present invention relates to compositions and methods of making asphaltic concrete.

BACKGROUND OF THE INVENTION

Asphaltic concrete is a commonly used paving material for roads, parking lots, etc. Asphaltic concrete is also referred to as "blacktop", "bituminous concrete" or simply as "asphalt" and is made up of an asphalt cement or binder and an aggregate. The asphalt cement permeates the voids between the individual pieces and particles of aggregate, binding the whole in a cementatious mass. Asphaltic concrete is readily workable, especially when heated (as in hot mix asphaltic concrete). The material can be compacted and rolled to provide a smooth surface. In addition, the asphaltic concrete serves as a barrier to water, thereby protecting the subgrade.

Unpaved dirt roads exhibit rutting and may even be washed out in heavy rains. Paving a road with asphaltic concrete extends the life of the road driving surface and allows relatively high vehicular traffic. The road driving surface retains a smoothness suitable for wheeled vehicles traveling at moderate to high speeds. Asphaltic concrete is less expensive than nonasphaltic concrete.

Roads paved with asphaltic concrete have a tendency to rut after being subjected to vehicular traffic. Rutted asphalt roads require maintenance and periodic replacement. One of the causes of rutting is the application of shear forces to the asphaltic concrete layer by vehicle tires. The shearing behavior of asphaltic concrete can be predicted with the Mohr-Coulomb Theory, as represented by the following equation:

$$\tau = c + \sigma (\tan \phi)$$

where, $\tau$ is the shear strength of the mixture c is cohesion $\sigma$ is normal stress $\phi$ is the angle of internal friction of the aggregate. Thus, the higher the cohesion of the asphalt binder and/or the higher the internal friction of the aggregate, the greater the shear strength and the more resistance to rutting in the paved surfaces.

It is desired to provide an asphaltic concrete that exhibits less rutting.

SUMMARY OF THE INVENTION

It is an object of the present invention to provide an asphaltic concrete composition that requires less maintenance than prior art compositions.

It is another object of the present invention to provide an asphaltic concrete composition that resists rutting.

The present invention provides a method of making asphaltic concrete. Sulfuric acid, citrus stripper oil and asphalt cement are mixed together to form an asphalt mixture. The asphalt mixture is mixed with an aggregate.

In accordance with one aspect of the present invention, the step of mixing the asphalt mixture with the aggregate further comprises heating the asphalt mixture before mixing with the aggregate.

In accordance with still another aspect of the present invention, after the asphalt mixture is mixed with the aggregate, the asphalt mixture is applied to a ground.

In accordance with another aspect of the present invention, the asphalt mixture is packed in place on the ground.

The present invention also provides a composition for use in paving roads. The composition comprises an asphalt cement and sulfuric acid and citrus stripper oil mixed with the asphalt cement.

The present invention also provides an asphaltic concrete composition comprising a packed and consolidated admixture of aggregate, asphalt cement, sulfuric acid and citrus stripper oil.

DESCRIPTION OF THE PREFERRED EMBODIMENT

The present invention makes an asphaltic concrete composition for paving and other purposes. Generally, an additive that includes sulfuric acid and citrus stripper oil is mixed with an asphalt cement to form an asphalt mixture. The asphalt mixture is then mixed with filler or aggregate to form the asphaltic concrete. The asphaltic concrete is then applied to the ground and compressed and packed until consolidated.

The individual components will be discussed, followed by a discussion of the mixing process.

The asphalt cement is a conventional and commercially available product. Asphalt cement is sometimes known as asphalt binder and is a dark brown to black cementatious material. The predominating components are bitumens which either occur naturally or are obtained by refining petroleum crude oil. The asphalt cement typically contains not only crude asphalt, but finished products such as cements, fluxes, the asphalt content of emulsions and petroleum distillates.

The present invention provides an additive to the asphalt cement. The additive increases the binding ability of the asphalt cement so as to result in less rutting. It is believed that the additive increases the cohesion of the asphalt cement when mixed with the aggregate.

In the preferred embodiment, the additive is made by mixing together sulfuric acid and citrus stripper oil in the following proportion:

| | |
|---|---|
| sulfuric acid | 85% |
| citrus stripper oil | 8.5% |
| surfactant | 6.5% |
| | 100% (by volume) |

The surfactant helps to mix the sulfuric acid and citrus stripper oil with the asphalt cement and with the aggregate. The present invention can be practiced without the surfactant. The use of citrus stripper oil and sulfuric acid are described in my prior U.S. Pat. Nos. 4,941,924 and 5,000,789, the disclosures of which are hereby incorporated by reference.

The sulfuric acid that is used is concentrated, being of the 1835 BE grade. The citrus stripper oil that is used is that which is so called by the citrus industry of Florida. It is also referred to as d-limonene because it is 94% to 98% d-limonene. Citrus stripper oil also includes 0.37% to 1.5% aldehydes and 0.07% to 2.46% esters. Some other chemical and physical properties of citrus stripper oil are given in *Florida Citrus Oils*, Bulletin 749 (technical), Agricultural Experiment Stations, Institute of Food and Agricultural Sciences, University of Florida, Gainsville, by J. W. Kesterson, R. Hendrickson and R. J. Braddock, December 1971,pp. 154–157. Citrus stripper oil is obtained as a by-product from the manufacturer of citrus molasses.

The surfactant used is a nonionic surfactant In the preferred embodiment, the surfactant used is nonylphenol polyethylene glycol ether NP-9.

The sulfuric acid, the citrus stripper oil and the surfactant are all mixed together. The additive mixture is then stored in containers, such as bottles and tanks.

The relative amounts of sulfuric acid to citrus stripper oil can vary. It is believed that at least 3% by volume of the additive should be citrus stripper oil, with the remaining 97% sulfuric acid. The maximum amount of citrus stripper oil to sulfuric acid is limited by practical considerations, such as expense. Another practical limitation is the tendency of the sulfuric acid and citrus stripper oil to separate. Separation is seen in quantities of citrus stripper oil exceeding 30% (by volume), with sulfuric acid 70% or less. Chilling the additive reduces the separation. For example, additives containing sulfuric acid to citrus stripper oil in the ranges 70%:30% to 80%:20% can be chilled to 40 degrees Fahrenheit or lower to prevent separation.

The aggregate or filler used is typically sand, gravel or crushed stone or a combination of these. The aggregate is also referred to as mineral aggregate. The aggregate can be coarse, medium or fine, or a combination thereof Different paving applications require different sizes of the aggregate, which generally is provided in a range of sizes. The larger the aggregate and the fewer fines (small or fine aggregate particles), the larger the spaces between the individual aggregate particles, thus requiring more asphalt cement.

To make asphaltic concrete, the sulfuric acid and citrus stripper oil additive is mixed with the asphalt cement to make an asphalt mixture. This asphalt mixture is then mixed with the aggregate.

The sulfuric acid and citrus stripper oil additive can be mixed with the asphalt cement at the job site, which is usually a road or other area to be paved, and which has on hand the aggregate. Alternatively, the sulfuric acid and citrus stripper oil additive can be mixed with the asphalt cement before arrival at the job site, such as at an asphalt plant. Mixing involves adding the additive to the asphalt cement and then mechanically mixing the liquids together. The asphalt cement may be elevated above room temperature to facilitate mixing. It is believed that the individual components can be separately added to the asphalt cement. For example, the sulfuric acid can be added to the asphalt cement separately from the citrus stripper oil.

In the preferred embodiment, the amount of the sulfuric acid and citrus stripper oil additive is 1.75% by weight mixed into 98.25% by weight of asphalt cement. It is believed that 4% by weight or less of the additive will produce satisfactory results in the asphaltic concrete. If too much additive is used, the asphaltic concrete becomes brittle and subject to cracking. One purpose of a pavement of asphaltic concrete is to seal the road from water, which water can damage the road bed or subgrade. Cracking in the pavement defeats this objective. In certain circumstances, more than 4% additive may be used. For example, if the asphalt cement is heated to mix with the aggregate (typically 350° Fahrenheit or less), then some of the additive will evaporate before the asphalt cement is mixed with the aggregate. Less than 1.75% by weight additive can be mixed with the asphalt cement. At lower amounts, some benefit can still be obtained. As discussed below, benefits can be seen with less than 1% additive. The asphalt cement can be provided in different grades. Higher grades of asphalt cement can contain the full amount (1.75% to 4% by weight) of the additive, while lower grades can contain lesser amounts of the additive.

At the job site, the asphalt cement with the additive is mixed with the aggregate. A typical proportion is 100 pounds of asphalt cement (with the additive) to 1900 pounds of aggregate. Proportions of the asphalt cement relative to the aggregate vary according to a variety of factors such as government practice in the particular jurisdiction the job site is located in, the type, size and shape of the aggregate, the surface that is to be paved, its use once paved, weather conditions, etc.

The asphalt cement and aggregate are mixed together in accordance with conventional practice. The asphalt cement is heated, as is the aggregate to form hot mix asphaltic concrete (H.M.A.C.). Heating the aggregate dries it and allows the asphalt to mix better. The aggregate and asphalt mixture are added to a pugmill which mixes the asphalt mixture into the aggregate to form the asphaltic concrete.

The asphaltic concrete is then applied to the ground by a spreading and finishing machine. The ground can be unprepared earth or it can be a prepared subgrade such as commonly used in roads, parking lots, etc. The asphaltic concrete is applied to and spread over ground that is dry. Once spread, the asphaltic concrete is then rolled to compact and consolidate the mixture. The roller can be moistened with water to prevent the mixture from sticking. Once the asphaltic concrete has been rolled to a satisfactory compaction and consolidation, the paving surface is now ready for use.

The asphaltic concrete of the present invention requires less maintenance than does conventional asphaltic concrete. It has greater shear strength and resists rutting more than conventional asphaltic concrete. It is believed that the use of citrus stripper oil and sulfuric acid in the asphalt cement increases the cohesion of the asphalt cement (c in the Mohr-Coulomb Theory).

For example, in one series of tests, the use of 0.5% by volume (approximately 0.85% by weight) of the additive reduced the rutting of asphaltic concrete. The table illustrates the results.

|  | asphaltic concrete without additive | asphaltic concrete with additive |
|---|---|---|
| VMA | 14.1% | 15.2% |
| Density | 96.9 | 95.6 |
| Ga | 2.355 | 2.332 |
| Gr | 2.431 | 2.438 |
| Avg. Str. Conditioned | 123.0 | 131.9 |
| HVEEM | 45 | 50 |
| Hamburg | 7.6 mm | 2.9 mm |

VMA is voids in mineral aggregation and is a measure of workability. The more voids in the asphaltic concrete the better, up to 25%. With more voids, there is more space for the asphalt cement to locate between the aggregate pieces and bind the pieces together. In the test samples, the voids increased a percentage point in the asphaltic concrete with the additive. Predictability, the density of the asphaltic concrete with the additive decreased slightly as the voids increased. The specific gravity (Ga) decreased and the Rice specific gravity (Gr) remained about the same. The average strength conditioned, a .freeze-thaw test, showed an increase in strength.

Two tests in particular are predictors of rutting of asphaltic concrete. One test, HVEEM, measures beam stability. The higher the HVEEM number, the less susceptible to rutting. The asphaltic concrete of the present invention increased the HVEEM by over 10% from 45 to 50. The Hamburg test is a direct test of rutting. A steel wheel is passed over an asphaltic concrete sample 20,000 times and the depth of the rutting is then measured. The conventional asphaltic concrete exhibited rutting of 7.6 mm deep, while the asphaltic concrete of the present invention exhibited rutting of only 2.9 mm deep, an improvement of over 50%.

Thus, the additive improves the ability of asphaltic concrete to resist rutting, thereby extending the overall maintenance of the asphaltic concrete over conventional concrete. Consequently, the costs associated with maintaining roads can be decreased.

In addition, using the additive reduces the amount of bleeding by the asphaltic concrete. Bleeding occurs when oil rises to the surface of the pavement, typically due to vehicle loads being applied to the pavement. The oil is not reabsorbed, but is instead picked up by tires or washed away. The loss of oil lessens the life of the asphaltic concrete.

The foregoing disclosure and showings made in the drawings are merely illustrative of the principles of this invention and are not to be interpreted in a limiting sense.

What is claimed is:

1. A method of making asphaltic concrete, comprising the steps of:
   a) mixing sulfuric acid, citrus stripper oil and asphalt cement to form an asphalt mixture;
   b) mixing the asphalt mixture with aggregate.

2. The method of claim 1 wherein the step of mixing the asphalt mixture with aggregate further comprises the step of heating the asphalt mixture before mixing with the aggregate.

3. The method of claim 1 further comprising the step of after mixing the asphalt mixture with aggregate, applying the asphaltic concrete to a ground.

4. The method of claim 3 further comprising the step of packing the asphalt mixture in place on the ground.

5. A composition for use in paving roads, comprising:
   a) an asphalt cement;
   b) sulfuric acid and citrus stripper oil mixed with the asphalt cement.

6. An asphaltic concrete composition, comprising a packed and consolidated admixture of aggregate, asphalt cement, sulfuric acid and citric stripper oil.

* * * * *